United States Patent

[11] 3,562,410

[72] Inventor John D. Lovely
Waterloo, Ontario, Canada
[21] Appl. No. 738,166
[22] Filed June 19, 1968
[45] Patented Feb. 9, 1971
[73] Assignee Electrohome Limited
Kitchener, Ontario, Canada

[54] COLOR TONE CONTROL NETWORKS FOR COLOR TELEVISION RECEIVERS
15 Claims, 6 Drawing Figs.

[52] U.S. Cl. ........................................................ 178/5.4
[51] Int. Cl. ........................................................ H04n 9/12
[50] Field of Search ............................................ 178/5.4

[56] References Cited
UNITED STATES PATENTS

| | | | |
|---|---|---|---|
| 2,954,426 | 9/1960 | Kroger ........................ | 178/5.4 |
| 2,955,152 | 10/1960 | Keizer ........................ | 178/5.4 |
| 3,301,945 | 1/1967 | Dietch ........................ | 178/5.4 |
| 3,457,362 | 7/1969 | Mackey et al. ............... | 178/5.4 |

*Primary Examiner*—Richard Murray
*Attorney*—Peter W. Mc Burney

ABSTRACT: The color tone of images reproduced by a color television receiver is changed by varying the ratio of the amplitudes of at least two different color hue signals translated by the chrominance signal channel of the receiver prior to matrixing with the luminance signal.

Figure 1:
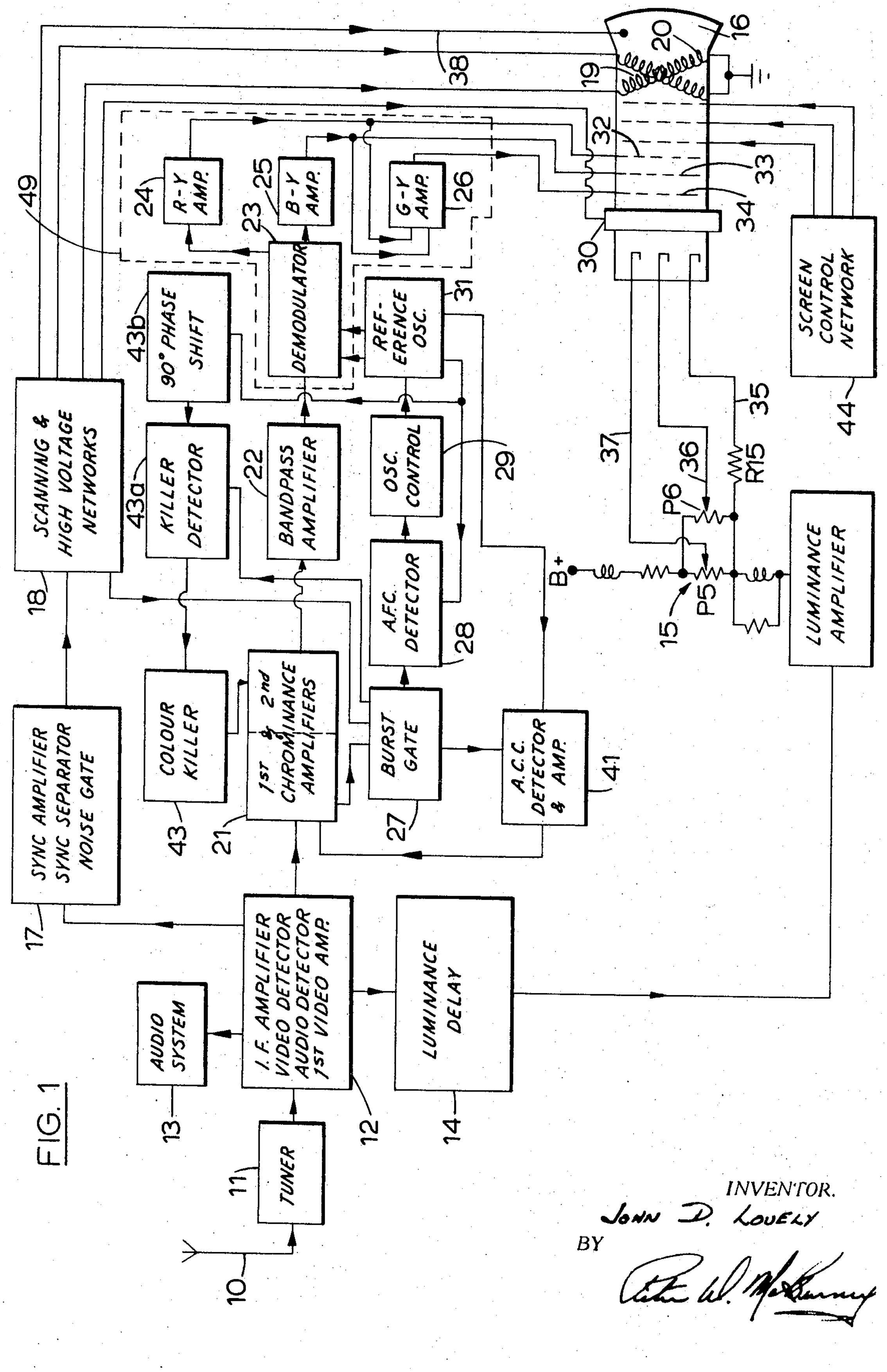

INVENTOR.
JOHN D. LOVELY
BY

INVENTOR.
JOHN D. LOVELY
BY

INVENTOR.
JOHN D. LOVELY
BY
Peter W. McBurney

INVENTOR.
JOHN D. LOVELY
BY

COLOR TONE CONTROL NETWORKS FOR COLOR TELEVISION RECEIVERS

This invention relates to compatible colour television receivers. More particularly, this invention relates to colour tone control networks which can be adjusted and set to the desired colour tone for viewing a televised image in colour but which will not affect colour temperature, which also can be preset using other controls, for monochrome reception.

It is well known that a reddish colour temperature of the order of, say, 8,000° K is necessary to enable a colour television receiver to reproduce flesh tones and shades of brown satisfactorily during reception of a colour television signal. On the other hand, reddish colour temperatures are not satisfactory during reception of a monochrome (black and white) television signal. In order to reproduce monochrome signals satisfactorily, higher temperatures of the order of, say, 9,350° K are required.

In recognition of the foregoing, a number of networks or devices have been provided for changing colour temperature automatically depending upon the type of television signal being received by a colour television receiver. Such networks or devices generally operate in such a way as to cause changes in the DC operating voltages of certain electrodes of the electron guns of the picture tube. Typical of colour temperature controls of this type are those shown in U.S. Pat. No. 2,954,426, issued Sept. 27, 1960, M. G. Kroger for Automatic Shift of Color Balance and U.S. Pat. No. 3,301,945, issued Jan. 31, 1967, L. Dietch for Automatic Color Temperature Control.

It also is known to provide a simple, grid bias control for the control grid electrodes of the electron guns of a picture tube. Such a control is not automatic in nature and must be operated manually to redden the raster for colour reception and to make the raster blue-white for monochrome reception. Typical of a colour temperature control of this type is that shown in U.S. Pat. No. 3,324,236, issued Jun. 6, 1967, L. Dietch for Color Temperature Control.

One disadvantage of prior art colour temperature controls that operate automatically is that they are dependent on proper operation of the colour killer network. If, for some reason, the colour killer network of a colour television receiver does not cut off the band-pass or other video amplifier in the chrominance signal channel of the receiver during monochrome reception, the colour temperature of the picture tube screen will remain at that set for colour signal reception, and the screen colour will be an undesired sepia. This result may be achieved either on account of malfunctioning of the colour killer network or as a result of a television station transmitting colour burst signals but no chrominance information, as often happens when a program televised in colour is interrupted by a commercial televised in black and white.

The instant invention, rather than relying upon changes in the DC operating voltages of certain electrodes of the electron guns of a picture tube, as is the case with the control networks shown in the aforementioned patents, makes use of the fact that in a colour television receiver chrominance information is supplied over a chrominance signal channel to the picture tube, while luminance information is supplied to the picture tube via a luminance channel separate from the chrominance signal channel. More specifically, in accordance with the instant invention, colour tone control means are provided for varying the ratio of the magnitudes of at least two of the three colour hue signals (signals containing information defining the hue and saturation of an image) translated by the chrominance signal channel of a colour television receiver prior to matrixing with the luminance signal. Because the colour tone control does not affect the DC operating conditions of the electron guns of the picture tube, the setting of the colour tone control means of the invention does not affect colour temperature during monochrome reception, and this may be adjusted by means of the electron guns of the picture tube. Thus, the potentiometers may be set to optimize colour temperature for monochrome reception, and the colour tone control means of the invention then may be set to give the desired colour tone during colour reception without affecting colour temperature for monochrome reception. Once so set, colour tone automatically will change as the signal being received changes from monochrome to colour and vice versa. Colour tone control means according to the invention are not dependent upon proper operation of a colour killer network. This is because colour tone is controlled by varying the ratio of, say, the red to blue hue signals received by a colour television receiver and translated by the chrominance signal channel thereof. If no chrominance information is being received, even although colour bursts are being received, or if the band-pass amplifier in the chrominance signal channel of the receiver is kept on for any reason during monochrome reception, the colour tone control means of the invention is rendered ineffective because of the absence of chrominance information which necessarily must be present before the aforesaid ratio can be varied or even exist as a numerical value.

Whereas colour temperature control networks of the type shown in the aforementioned patents all operate in such a manner that the complete screen of a colour picture tube automatically becomes or is adjusted to become more sepia in tone during colour reception, in accordance with the instant invention, the tones of two or more colours are changed relative to each other. Thus, for colour reception the reds may become deeper and the blues lighter than is the case during monochrome reception.

This invention will become more apparent from the following detailed description, taken in conjunction with the appended drawings, in which:

FIG. 1 is a block diagram of a typical colour television receiver, a part of the otherwise conventional circuitry within the block shown in dotted outlines being modified in accordance with this invention; and FIGS. 2 to 6 inclusive illustrate five different colour tone control networks embodying the instant invention.

Those skilled in the art will appreciate that the colour television receiver shown in FIG. 1 employs conventional components for the most part, so that only a brief description will be given herein of the conventional components of the receiver of FIG. 1 and their mode of operation. With reference to FIG. 1, an antenna 10 is connected to the input circuit of a tuner 11 that comprises one or more radio frequency (R.F.) amplification stages and a first detector. The signal to which the tuner is tuned is amplified by the R.F. amplifier or amplifiers and detected, the detected signal then being applied to a block designated 12 containing one or more intermediate frequency (I.F.) amplifiers, a video detector, an audio detector and a first video amplifier. The detected signal from tuner 11 is amplified by the one or more I.F. amplifiers, the audio and video components of the signal detected, and the video signal amplified by the first video amplifier.

The luminance component (Y) of the video signal is delayed and then applied to the luminance amplifier and drive control network 15 for the conventional three gun picture tube 16 of the receiver. As shown, the drive control network has three output lines 35, 36 and 37 connected to the cathodes of the "red," "green" and "blue" electron guns respectively of picture tube 16.

The detected audio signal is supplied to a block 13 designated audio system and comprising a limiter, a discriminator, an audio frequency (A.F.) amplifier of one or more stages and a loudspeaker, the audio signal thereby being reproduced in a well known manner.

Synchronizing (sync) information is derived by one of the detectors in block 12 and applied to a block 17 consisting of a sync amplifier, sync separator and noise gate. The sync signal output from block 17 is applied to a block 18 containing the scanning and high voltage networks of the receiver. More specifically, block 18 comprises a horizontal scanning signal generator consisting of a line frequency oscillator, a phase detector, and a frequency control stage for providing automatic control of the oscillator frequency; a vertical scanning signal generator; a horizontal convergence network; and a vertical convergence network. A horizontal scanning signal is developed and applied to the primary winding of an output transformer (not shown) having its secondary winding connected to the horizontal scanning coil 20 of the deflection yoke (not shown) of the receiver. A vertical scanning signal is developed and is coupled to the vertical scanning coil 19 of the deflection yoke of the receiver. Vertical and horizontal convergence signals also are developed and applied to a deflection yoke assembly shown schematically at 30. One high voltage DC voltage output line 38 of the high voltage network of block 18 also is connected to picture tube 16.

An automatic gain control system may be included within block 17 to develop an A.G.C. potential for application to tuner 11 and one of the I.F. amplification stages in block 12, as is well known.

The chrominance component of the video signal is amplified by first and second chrominance amplifiers 21, and a part of the signal then is applied to a band-pass amplifier 22, another part of the signal being applied to a colour burst amplifier or gate 27. Keying pulses from block 18 are applied to colour burst amplifier 27, and it applies its output to an automatic frequency control (A.F.C.) detector 28, an automatic chroma control (A.C.C.) detector and amplifier network 41 and a killer detector **43*a*. A.F.C. detector 28 provides a control signal that is applied to an oscillator control device 29 that controls the frequency of a colour or reference oscillator 31. The output signal of oscillator 31 is applied to A.C.C. detector 41, A.F.C. detector 28 and a colour demodulator 23 and also to killer detector 43*a* via a 90° phase shift network 43*b*. The output signal of band-pass amplifier 22 also is applied to demodulator 23, which may comprise a pair of synchronous demodulators for developing a red colour difference signal (R—Y) and a blue colour difference signal (B—Y). A green colour difference signal (G—Y) is obtained by matrixing the red and blue colour difference signals; and these three signals are amplified by colour difference amplifiers 24, 25 and 26 respectively and applied directly or via keyed clamps (not shown) to the control grids 32, 33 and 34 respectively of the three electron guns of picture tube 16**.

The operating frequency and phase of oscillator 31 corresponds to that of the colour burst signal (3.58 MHz), and the oscillator output signal and the signal from burst amplifier or gate 27 are compared in A.C.C. detector 41. A.C.C. detector 41 produces a signal indicative of reception of a colour signal and that varies in magnitude with the level of the received signal. This signal is supplied to the first chrominance amplifier in block 21 to vary the gain of this amplifier to compensate for variations in the level of the received signal. The output of a colour killer 43 is applied to the second chrominance amplifier in block 21 and determines whether this amplifier is biased on or off, colour killer 43 being connected to killer detector **43*a*. In the absence of a colour burst signal, killer 43** biases the second chrominance amplifier off.

The block 44 designates a conventional screen control network connected to the three screen electrodes of the three guns of colour picture tube 16.

Various embodiments of this invention are shown in FIGS. 2 to 6 inclusive, the networks shown in each of these FIGS. being the components within dotted line 49 shown in FIG. 1.

The networks of FIGS. 2 to 6 are similar to each other, and each includes a B—Y or Z and an R—Y or X demodulator, these being in the form of pentodes **23*a* and 23*b* respectively; low pass filters 50 and 51; R—Y, B—Y and G—Y amplifiers 24, 25 and 26 respectively; blocking capacitors C1 and C2; grid resistors R1 and R1; load resistors R3 and R4 connected to a source of positive potential (B+); demodulator cathode resistors R5 and R6; colour difference amplifier load resistors R7, R8 and R9; colour difference amplifier cathode resistors R10, R11 and R12; matrixing resistors R13 and R14; a blocking capacitor C3; a grid resistor R16; colour difference signal amplifier output terminals 52, 53 and 54; oscillator signal input terminals 55 and 56; and chrominance signal input terminals 57 and 58**.

Figure 3:
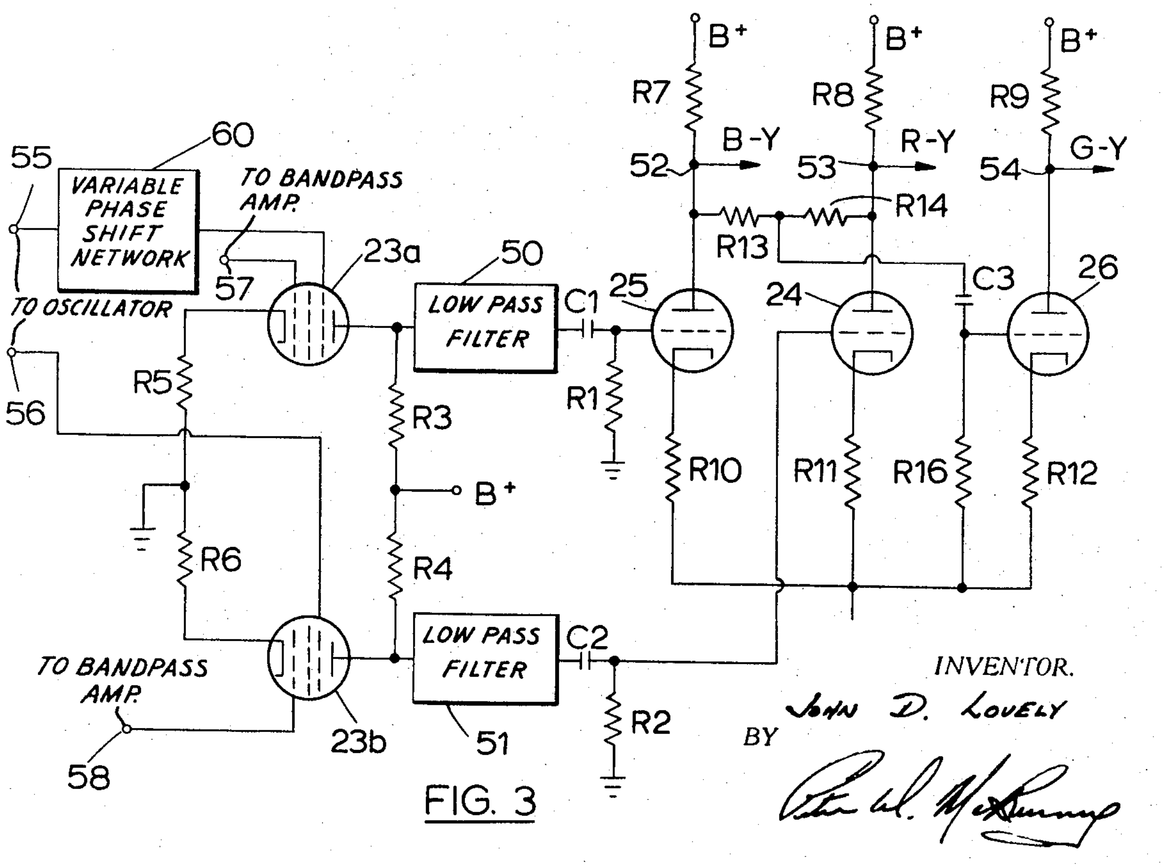

Oscillator signal input terminals 55 and 56 are connected to oscillator 31 (FIG. 1) and receive signals 90° out of phase. They also are connected to the suppressor grids of pentodes **23*a* and 23*b* respectively. In the embodiment of FIG. 3, a variable phase shift network 60, which may be of any known type, is connected between terminal 55 and the suppressor grid of pentode 23*a* so as to permit the phase of the oscillator signal delivered to the suppressor grid of pentode 23*a* to be varied relative to the phase of the oscillator signal delivered to the suppressor grid of pentode 23*b***.

Figure 5:
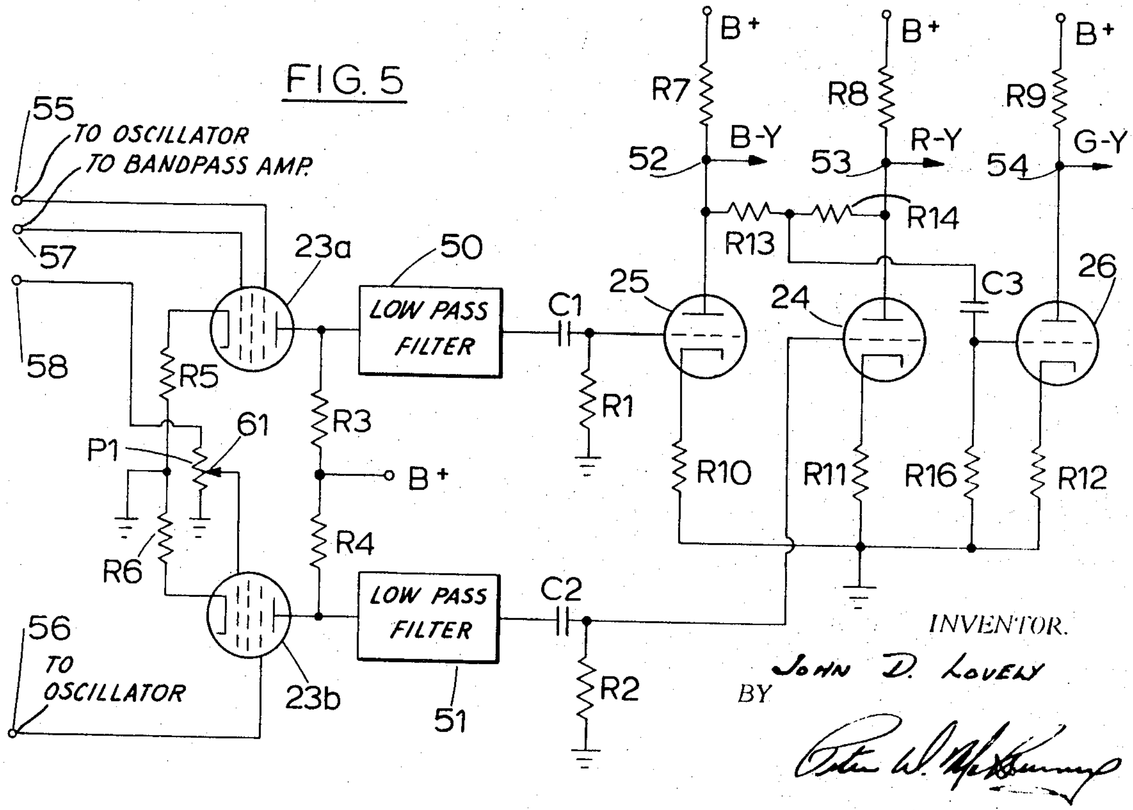

Chrominance signal input terminals 57 and 58 are in the chrominance signal channel of the receiver and are connected together and to band-pass amplifier 22 and receive a chrominance signal therefrom during colour signal reception. Terminals 57 and 58 are connected to the control grid electrodes of pentodes **23*a* and 23*b* respectively. In the embodiment of FIG. 5, terminal 58 is connected to the control grid of pentode 23*b* via the slider 61 of a potentiometer P1 so as to permit the amplitude of the chrominance signal delivered to the control grid of pentode 23*b* to be varied relative to the amplitude of the chrominance signal delivered to the control grid of pentode 23*a***.

For the sake of simplicity, the biasing networks for the screen grids of pentodes **23*a* and 23*b*** have been omitted.

Figure 2:
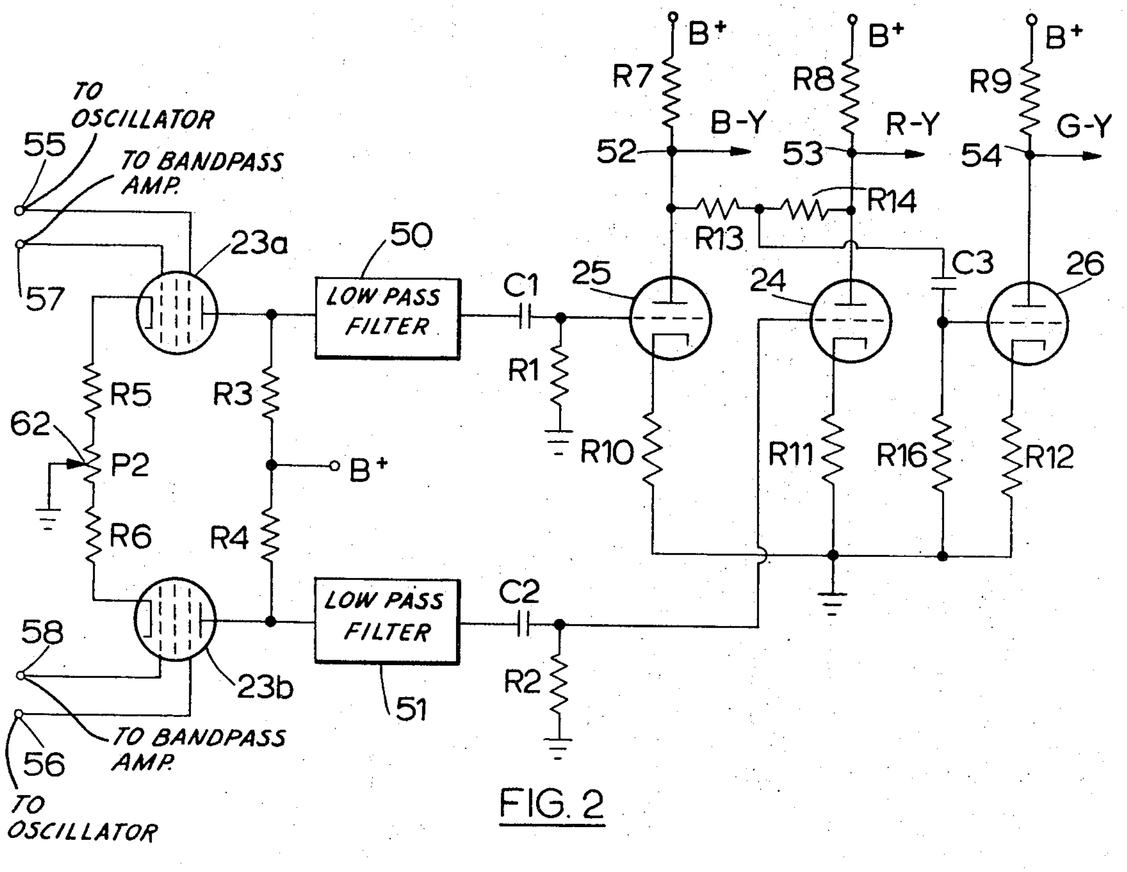

The cathodes of pentodes **23*a* and 23*b* are connected to a terminal at a reference potential, in the present case, ground potential, via cathode resistors R5 and R6 respectively. In the embodiment of FIG. 2, a potentiometer P2 having a slider 62 is included, the potentiometer terminals being connected to resistors R5 and R6, and slider 62 being grounded. By varying the position of slider 62, the relative gain of pentodes 23*a* and 23*b*** may be varied, one increasing in gain while the other decreases in gain.

Figure 4:
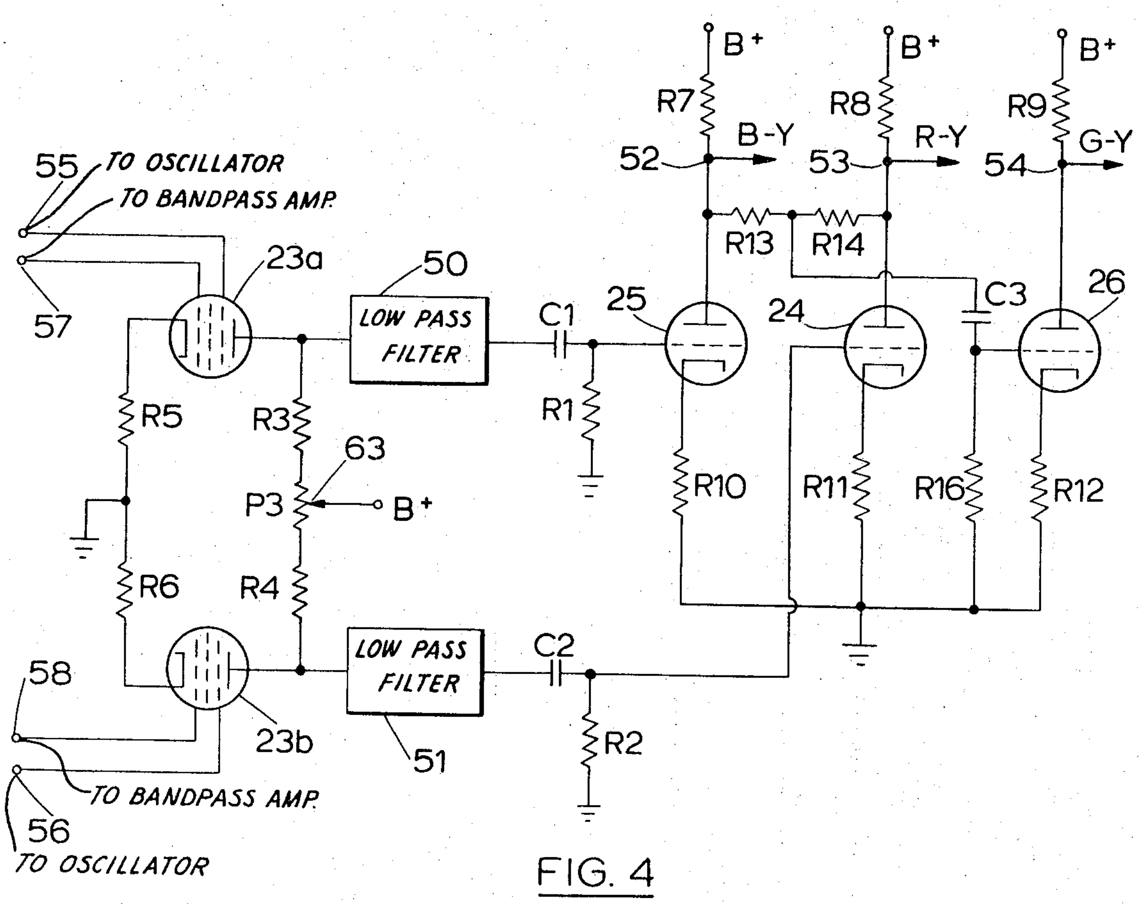

The plate electrodes of pentodes **23*a* and 23*b* are connected to B+ via resistors R3 and R4 respectively. In the embodiment of FIG. 4, a potentiometer P3 having a slider 63 is included, the terminals of potentiometer P3 being connected to resistors R3 and R4, and slider 63 being connected to B+. By varying the position of slider 63, the relative gain of pentodes 23*a* and 23*b*** may be varied, one increasing in gain while the other decreases in gain.

The plate electrodes of pentodes **23*a* and 23*b* are connected via low pass filters 50 and 51 respectively of known type and capacitors C1 and C2 respectively to the control grid electrodes of colour difference signal amplifying triodes 25 and 24 respectively resistors R1 and R2** being connected between the control grids of these triodes and a terminal at ground potential.

The plate electrodes of colour difference signal amplifying triodes 24, 25 and 26 are connected to B+ i a load resistors R8, R7 and R9 respectively, and, during reception of a colour signal, R—Y, B—Y and G—Y (colour difference signals) appear at output terminals 53, 52 and 54 respectively located between the plates of triodes 24, 25 and 26 respectively and load resistors R8, R7 and R9 respectively. Output terminals 52, 53 and 54 are connected to control grid electrodes 33, 32 and 34 (FIG. 1) of the blue, red and green guns respectively of picture tube 16 (FIG. 1).

Cathode resistors R10, R11 and R12 are connected between the cathodes of triodes 25, 24 and 26 respectively and a terminal at ground potential. In the embodiment of the invention shown in FIG. 6, a potentiometer P4 having a slider 64 is included, the terminals of potentiometer P4 being connected to the cathodes of triodes 24 and 25, and slider 64 being connected via a decoupling capacitor C4 to a terminal at ground potential. By varying the position of slider 64, the gain of one of triodes 24 and 25 can be increased, while the gain of the other is decreased.

Resistors R13 and R14 are connected between the plate electrodes of triodes 24 and 25. Matrixing, which is known per se, to create the green colour difference signal from the red and blue colour difference signals takes place in this resistive network, and the resultant signal is applied to the grid electrode of triode 26 via blocking capacitor C3. Resistor R16 is connected between the grid electrode of triode 26 and a terminal at ground potential.

Referring again to FIG. 1, as is well known, in order to set up picture tube 16 for proper operation, potentiometers (not shown) in screen control network 44 are adjusted so that the red, green and blue guns of the picture tube all will cutoff at the same level. Optimum colour temperature for black and white viewing can be established by appropriate settings of the sliders of potentiometers P5 and P6 in the cathode circuits of the green and blue electron guns of picture tube 16. The red drive is fixed at a value determined by the value of resistor R15 in the cathode circuit of the red gun of the picture tube, but, if desired, a potentiometer could be substituted for resistor R15.

With reference now to FIGS. 2 to 6, as is well know, demodulators **23*a* and 23*b* derive blue and red colour difference signals respectively during reception of a colour television signal, and these signals are applied to the control grid electrodes of triodes 25 and 24 respectively. A green colour difference signal is derived in the manner previously explained, and amplified R—Y, B—Y and G—Y signals appear at output terminals 53, 52 and 54 respectively and are applied to the control grids of the red, blue and green guns of picture tube 16**, the luminance signal (Y) being applied to the cathode electrodes of these guns.

In accordance with the embodiments of the invention shown in FIGS. 2 and 4, colour tone can be varied by increasing the gain of one of the demodulators, while decreasing the gain of the other, thereby varying the ratio of the magnitudes of the blue to red colour difference signals translated by the chrominance signal channel of the receiver. Thus, if slider 62 is moved upwardly from the position thereof shown in FIG. 2, the gain of demodulator **23*a* will increase, while the gain of demodulator 23*b* will decrease, thereby increasing the ratio of the amplitudes of B—Y to R—Y. Similarly, if slider 62 is moved downwardly from the position thereof shown in FIG. 2, the gain of demodulator 23*a* will decrease, while the gain of demodulator 23*b*** will increase, the result being a decrease in the ratio of the amplitudes of B—Y to R—Y, this change being in the direction desired to optimize viewing during colour signal reception.

With reference to FIG. 4, movement of slider 63 upwardly from the position thereof shown in FIG. 4 will decrease the gain of demodulator **23*a* and increase the gain of demodulator 23*b* thereby decreasing the ratio of the amplitudes of B—Y to R—Y, the opposite being the case for downward movement of slider 63**.

In the embodiment of the invention shown in FIG. 3, changes in colour tone are achieved by means of variable phase shift network 60. Normally the red and blue axes of demodulation are at right angles to each other. By varying the phase shift introduced by network 60, the angle between these axes can be increased or decreased. For a given chrominance signal, increasing the angle effectively increases the ratio of the amplitudes of B—Y to R—Y, while decreasing the angle has the opposite effect.

In the embodiment of the invention shown in FIG. 5, changes in colour tone are achieved by varying the drives of the B—Y and R—Y demodulators. Thus, by moving slider 61 downwardly from the position thereof shown in FIG. 5, the drive to demodulator **23*b* is decreased, increasing the ratio of the amplitudes of B—Y to R—Y, while the opposite effects result from moving slider 61** upwardly. In this embodiment resistor R3—R6 can be chosen so that normal colour reception occurs with the slider of potentiometer P1 set so that it can be adjusted in either direction.

Figure 6:
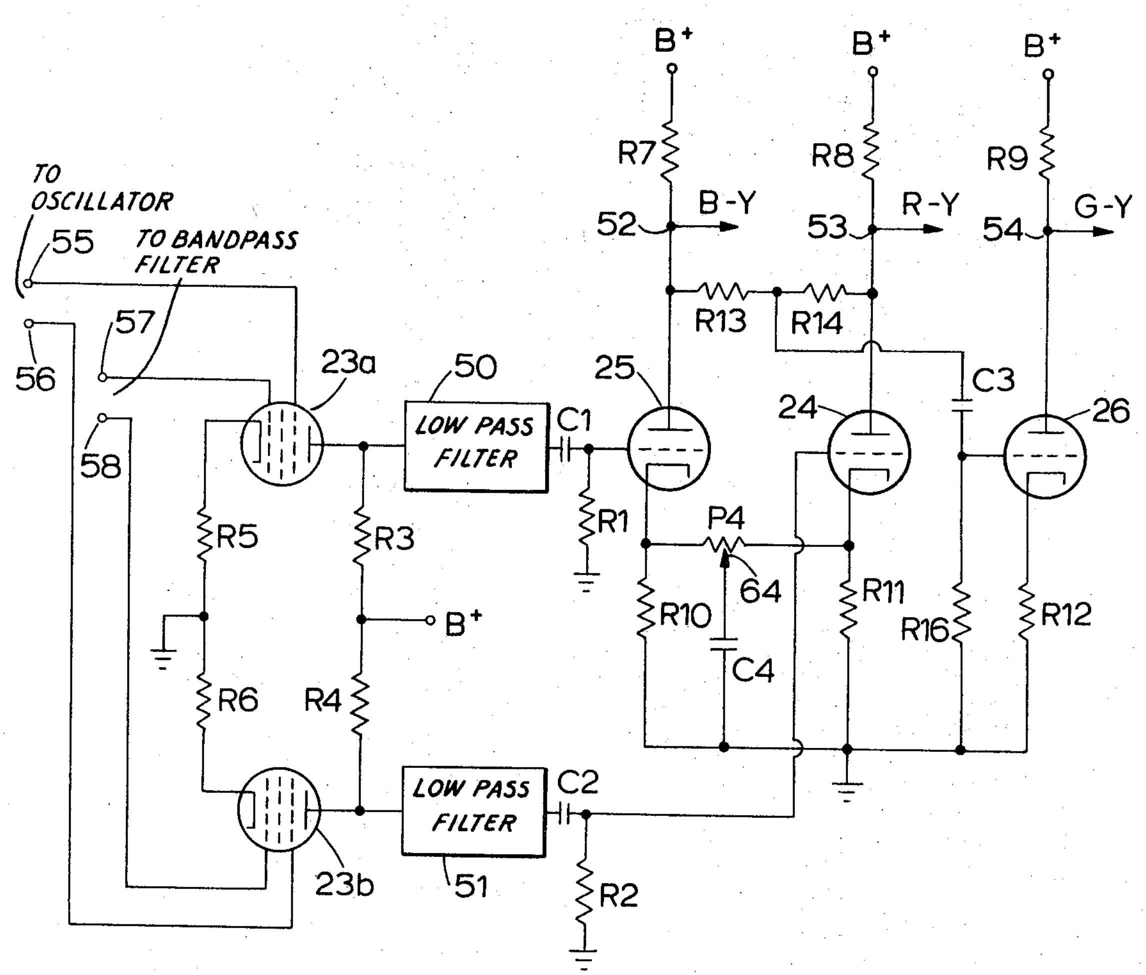

In the embodiment of the invention shown in FIG. 6, changes in colour tone are achieved by varying the gains of amplifiers 24 and 25. By moving slider 64 to the left from the position thereof shown in FIG. 6, the resistance in the cathode circuit of triode 25 is decreased, and the resistance in the cathode circuit of triode 24 is increased. This increases the gain of the B—Y amplifier and decreases the gain of the R—Y amplifier, thereby increasing the ratio of the amplitudes of B—Y to R—Y. The opposite effects result from moving slider 64 to the right from the position thereof shown in FIG. 6.

It is important to note that in all of the embodiments of the invention changes in colour tone introduced by varying the setting of phase shift network 60 or the position of sliders 61, 62, 63 and 64 have no effect whatsoever on colour temperature for monochrome reception. This is set by resistor R15 and potentiometers P5 and P6 as previously described herein and remains unaffected by colour tone control networks embodying the invention, since these networks are effective only to vary the ratio of the amplitudes of different colour hue signals translated by the chrominance signal channel of the receiver. If no chrominance signal is present, whether this be due to reception of a monochrome signal with or without a colour burst, colour temperature automatically will revert to that set by resistor R15 and potentiometers P5 and P6.

It is not necessary for the gain of one demodulator to be increased while the gain of the other is decreased or for the gain of one colour difference amplifier to be increased while the gain of another is decreased. Changes in colour tone can be effected merely by increasing or decreasing the gain of one demodulator or of one colour difference amplifier.

It should be apparent from the foregoing that phase shift network 60 or sliders 61 to 64 can be set by the customer to give the best colour tone for colour reception. The colour tone thus set will be assumed automatically during reception of a colour signal. However, during reception of a monochrome signal, even one including colour bursts, colour temperature automatically will assume a value determined by resistor R15 and potentiometers P5 and P6.

While, in all of the embodiments of the invention shown in FIGS. 2 to 6, the amplitudes of one or more colour difference signals are varied, this is not essential to the invention. In some colour television receivers the colour difference signals are matrixed with the luminance signal ahead of the picture tube and both the luminance and chrominance information is supplied to the cathodes of the electron guns of the picture tube. In such cases, —R, a nd —G colour signals may be applied to the cathodes of the red, blue and green guns of the picture tube. In instances where R, G and B colour signals are derived ahead of the picture tube, this invention may be practised by varying the amplitude of one or more of the colour difference signals from which the R, G and B signals are derived to change the ratio of the amplitudes of two of the colour signals. In general, this invention may be practised by varying the ratio of the amplitudes of at least two different signals translated by the chrominance signals channel prior to matrixing with the luminance signal, whether this matrixing takes place within the picture tube or external thereto. Thus the invention may be practised when demodulation takes place about the I and Q axes.

While the embodiments of the invention shown in FIGS. 2 to 6 show how the ratio of blue to red colour difference signals can be varied, this is not essential to the invention. Colour tone can be controlled in accordance with this invention by varying one or more of the red, blue or green colour difference signals as long as a change in ratio of the amplitudes of two of the colour difference signals results.

It should be noted that the invention is in no way restricted to the type of demodulators and colour difference amplifiers shown in FIGS. 2 to 6. The invention may be practised using other types of demodulators and colour difference amplifiers.

I claim:

1. In a receiver for reproducing monochrome and colour images of televised scenes of a type having a chrominance signal channel, a luminance signal channel, a picture tube having a plurality of electron guns each including a cathode and grid electrode, means connecting said channels to said electron guns to supply signals translated by said channels to said electron guns, said luminance signal channel including means for varying the magnitude of the luminance signal translated by said luminance signal channel to vary the brightness of said images, the improvement comprising colour tone control means for varying the colour tone of said images, said colour tone control means comprising means for varying the ratio of the amplitudes of at least two different colour hue signals translated by said chrominance signal channel prior to matrixing with said luminance signal.

2. The invention according to claim 1 wherein said chrominance signal channel includes a red hue signal demodulator and a blue hue signal demodulator, said colour tone control means comprising means for varying the gain of at least one of said demodulators relative to the gain of the other of said demodulators.

3. The invention according to claim 1 wherein said chrominance signal channel includes a red hue signal demodulator and a blue hue signal demodulator, said colour tone control means comprising means for simultaneously increasing the gain of one of said demodulators and decreasing the gain of the other of said demodulators.

4. The invention according to claim 3 wherein said demodulators comprise electron discharge devices each having plate, cathode and grid electrodes, said colour tone control means comprising a potentiometer having a slider, said potentiometer being connected between said cathode electrodes of said electron discharge devices, said slider being connected to a terminal at a reference potential.

5. The invention according to claim 3 wherein said demodulators comprise electron discharge devices each having plate, cathode and grid electrodes, said colour tone control means comprising a potentiometer having a slider, said potentiometer being connected between said plate electrodes, said slider being connected to a source of DC potential.

6. The invention according to claim 1 wherein said chrominance signal channel includes a red hue signal demodulator and a blue hue signal demodulator, said demodulators each comprising electron discharge devices each having plate, cathode and grid electrodes, said grid electrodes of said electron discharge devices being connected in said chrominance signal channel, said colour tone control means comprising a variable impedance device connected in circuit with one of said grid electrodes of said electron discharge devices for varying the amplitude of the chrominance signal supplied to said one grid electrode.

7. The invention according to claim 1 wherein said colour tone control means comprise means for varying the angle between the axes of demodulation of said two different colour hue signals.

8. The invention according to claim 7 wherein said chrominance signal channel includes a red hue signal demodulator and a blue hue signal demodulator, said demodulators each comprising electron discharge devices each having plate, cathode and grid electrodes, said receiver also including a reference oscillator connected to supply reference oscillations to one of said grid electrodes of each of said electron discharge devices, said colour tone control mean means comprising means for varying the phase of said reference oscillations supplied to one of said electron discharge devices relative to the phase of said reference oscillations supplied to the other of said electron discharge devices.

9. The invention according to claim 7 wherein said chrominance signal channel includes a red hue signal demodulator and a blue hue signal demodulator, said receiver also including a reference oscillator connected to supply reference oscillations to said demodulators, said colour tone control means comprising means for varying the phase of said reference oscillations supplied to one of said demodulators relative to the phase of said reference oscillations supplied to the other of said demodulators.

10. The invention according to claim 1 wherein said chrominance signal channel includes red and blue hue signal demodulators and red and blue hue signal amplifiers connected thereto, said colour tone control means comprising means for varying the gain of at least one of said amplifiers relative to the gain of the other of said amplifiers.

11. The invention according to claim 10 wherein said amplifiers comprise electron discharge devices having plate, cathode and grid electrodes, said colour tone control means comprising a potentiometer having a slider, said potentiometer being connected between said cathode electrodes of said electron discharge devices, said slider being connected via a capacitor to a terminal at a reference potential.

12. The invention according to claim 1 wherein said chrominance signal channel includes red, blue and green hue signal amplifiers, said colour tone control means comprising means for varying the gain of at least one of said amplifiers relative to the gain of another of said amplifiers.

13. The invention according to claim 12 wherein said red, blue and green hue signals are colour difference signals and said amplifiers are colour difference signal amplifiers.

14. The invention according to claim 2 wherein said red hue signal is a red colour difference signal and said blue hue signal is a blue colour difference signal.

15. The invention according to claim 1 wherein said two different colour hue signals are colour difference signals.